Dec. 28, 1965   J. C. STILES   3,225,606
COUNTER-ROTATION BEARING RACE DRIVE MECHANISM FOR GYROS
Filed Jan. 16, 1961   3 Sheets-Sheet 1

JOHN C. STILES
INVENTOR.

BY S. A. Giarratana

ATTORNEYS

Dec. 28, 1965     J. C. STILES     3,225,606
COUNTER-ROTATION BEARING RACE DRIVE MECHANISM FOR GYROS
Filed Jan. 16, 1961     3 Sheets-Sheet 2

JOHN C. STILES
INVENTOR.

BY *S. A. Ifarratana*

*ATTORNEYS*

Dec. 28, 1965         J. C. STILES         3,225,606
COUNTER-ROTATION BEARING RACE DRIVE MECHANISM FOR GYROS
Filed Jan. 16, 1961                       3 Sheets-Sheet 3

JOHN C. STILES
INVENTOR.

3,225,606
COUNTER-ROTATION BEARING RACE DRIVE
MECHANISM FOR GYROS
John C. Stiles, Morristown, N.J., assignor to General Precision, Inc., Little Falls, N.J., a corporation of Delaware
Filed Jan. 16, 1961, Ser. No. 83,035
7 Claims. (Cl. 74—5)

The present invention relates to a gyroscope, and more particularly to a gyroscope in which the inner or outer races of the bearings of the precession axis are oscillated.

This application represents an improvement over a co-pending application for U.S. patent filed by Elias G. Chaggaris, on a "Counterrotating Bearing Race Drive Apparatus for Gyroscopes" filed in U.S. Patent Office on the 19th day of December 1960, Serial Number 76,712 and assigned to the same assignee as the present invention.

While the bearings for gyroscopes must be of a very high quality, and while great precision is utilized in making and assembling such bearings, it has nevertheless been found that even such precision bearings have dissimilar bearing friction levels, and that this fact interferes with the proper and anticipated operation of the gyroscope. In particular, the dissimilar bearing friction levels is a factor in the so-called "drift" error.

An object of the present invention is the provision of a gyroscope construction in which the outer races of the bearings on the precession axis or any other gimbal axis, are alternately rotated in opposite directions.

A further object of the present invention is to provide a construction for oscillating the inner or outer bearing races of bearings located on the precession axis, or any other gimbal axis, wherein the entire drive mechanism may be readily assembled or disassembled independently of the basic gyroscope unit.

A still further object of the present invention is the provision of a gyroscope in which the inner or outer races of the bearings on the precession axis, or any other gimbal axis, are caused to oscillate by a mechanism including a toggle switch, which will thereby eliminate the use of an additional detent mechanism.

Other objects and the nature and advantages of the instant invention will be apparent from the following description taken in conjunction with the accompanying drawings, wherein.

Figure 1:
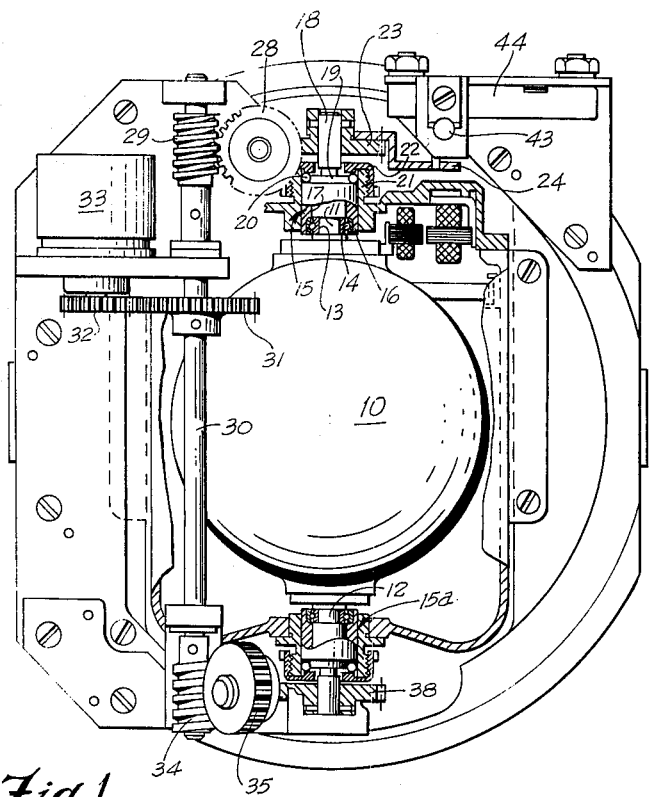
FIGURE 1 is a partial longitudinal section and partial front elevational view through the precession axis of a gyroscope in accordance with the present invention.

Referring now to the drawings, wherein like or corresponding reference numerals are used to designate like or corresponding parts throughout the several views, there is shown in FIGURE 1 a gyroscope assembly generally designated 10 and having an upper stub shaft 11 and a lower stub shaft 12. Upper stub shaft 11 is supported in an inner race 13 of a ball-bearing which is in engagement with the balls 14 that are carried in an outer race and extension unit 15. The outer race and extension unit 15 has at its lower end an outer race part 16, a cylindrical extension 17 and a shaft 18. Above the cylindrical part 17 there is a reduced outer shoulder 19, and balls 20 between the shoulder 19 and an adapter 21 to permit the ready rotation of the entire unit 15. A retaining and thrust nut 22 is in engagement with the adapter 21 to thereby retain the unit 15 in its proper relationship.

Figure 2:
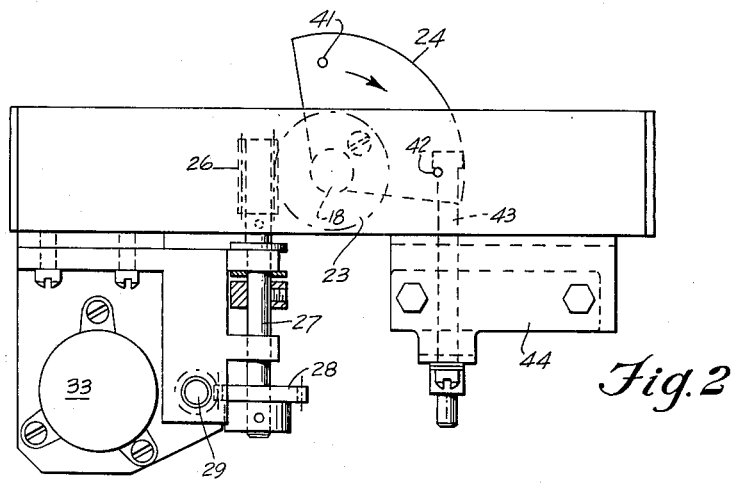
FIGURE 2 is a top plan view of gyroscope shown in FIGURE 1.

Secured to the shaft 18 of the outer race and extension unit 15 is a worm wheel 23 to which is connected a sector 24, as may also be seen in FIGURE 2. The worm wheel 23 is driven by a worm 26 on a shaft 27, which latter is driven from another worm gear 28. Worm gear 28 is in turn driven by a worm 29 carried on a counter shaft 30. Counter shaft 30 has a spur gear 31 secured to it, the spur gear 31 being in mesh with a pinion 32 carried on the drive shaft of a reversible servo motor 33.

Figure 3:
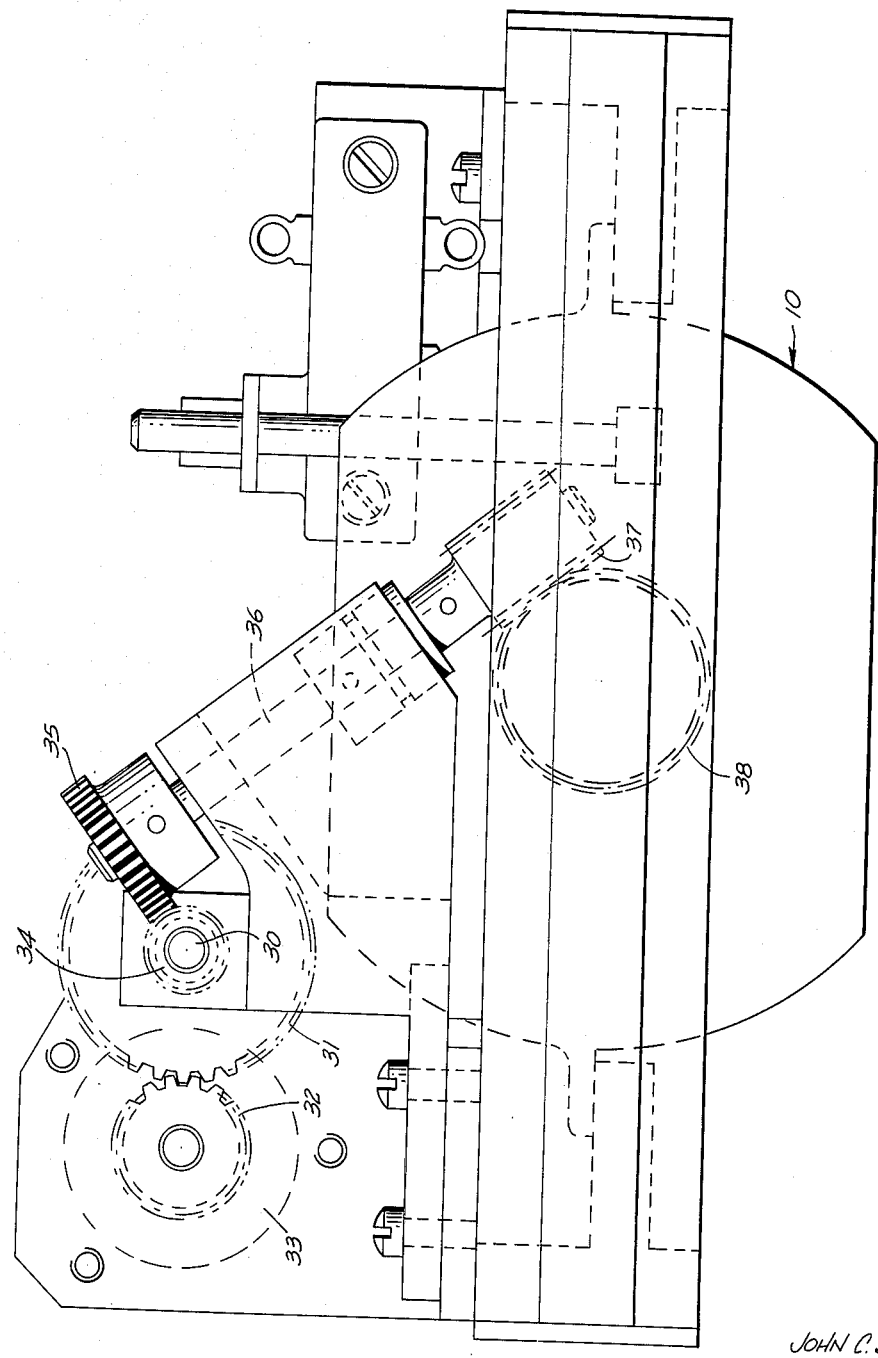
FIGURE 3 is a bottom plan view of the gyroscope shown in FIGURE 1, and to an enlarged scale.
Figure 6:
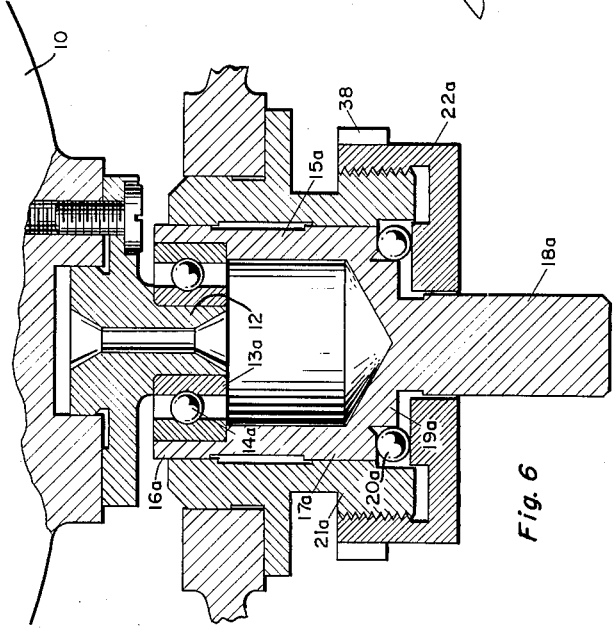
FIGURE 6 is an enlarged fragment of a lower portion of FIGURE 1.

As will be understood, lower stub shaft 12 is carried in substantially the same arrangement as upper stub shaft 11 and accordingly, the lower journal structure has its parts designated with reference numerals corresponding to those of the upper journal but with the literal suffix "a" appended, thus eliminating the need for any further description. The outer race of the bearing of the lower journal is also driven from the counter shaft 30 and the motor 33. Thus, and referring to the lower part of FIGURE 1 and to FIGURES 3 and 6, there may be seen on the counter shaft 30 a worm 34 in mesh with a worm gear 35. The gear 35 causes a shaft 36 to which it is attached to rotate and to in turn drive a worm 37 which is in mesh with a worm gear 38 which corresponds to the gear 23, but which has no sector secured to it.

Figure 4:
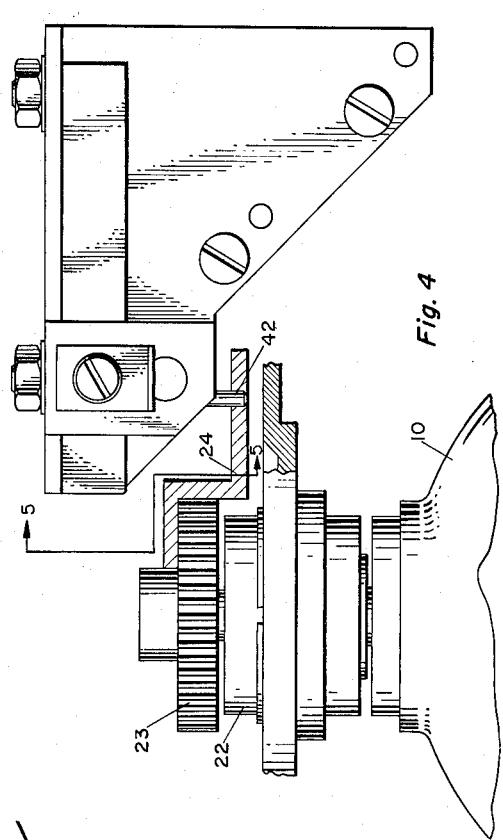
FIGURE 4 is an enlargement of an upper portion of FIGURE 1 with parts shown principally in elevation.
Figure 5B:
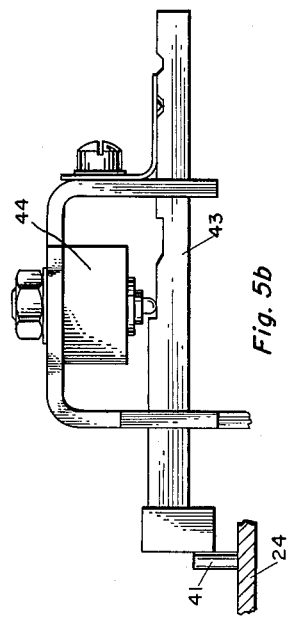
FIGURES 5a and 5b are similar fragmentary elevations, partly in section, as viewed on line 5—5 of FIGURE 4 showing parts in different positions.
Figure 5A:
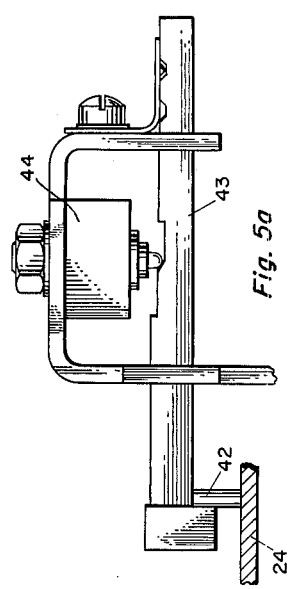

Referring now to FIGURES 2 and 4, it may be seen that the sector 24 carries the circumferentially spaced and upstanding pins 41 and 42, these pins being engageable upon rotation of the sector 24, with the head of a rod 43 which actuates, in known fashion, a single pole double throw switch 44. Thus, as will be understood, when the parts are in the position shown in FIGURES 2 and 5a, the pin 42 has just contacted the head of the rod 43, and has thrown the single pole double throw switch 44, so that by a circuit to be herein below described, the motor 33 will change its direction of rotation and cause the shaft 18 and sector 24 to begin rotating in a clockwise direction as is shown in FIGURE 2. This will cause the pin 42 to move out of engagement with the head of the rod 43, and will simultaneously cause the pin 41 to approach the head of the rod 43. After a predetermined amount of rotation of the sector 24, the pin 41 will engage the head of rod 43 as shown in FIG. 5b to thereby cause rod 43 to again throw the single pole double throw switch 44, and to thereby again cause the servo motor 33 to reverse its direction of rotation. Thereafter, pin 41 will move away from the head of the rod 43 and the pin 42 will approach it, and engage it, to thereby again throw the switch 44.

While many circuits for connecting the switch 44 with the motor 33 will be apparent, a preferred circuit includes the switch 44 in the secondary of a transformer, the transformer itself being center tapped and grounded, so that the switch 44 may engage either of the ends of the transformer. The switch 44 also being connected with a phase winding of the servo motor, it will cause the current flow through this winding to reverse upon reversal of the switch position.

As will be understood, the motor 33 will cause the shaft 30 to rotate, and to rotate through the gear trains above described the two outer race units 15, 15a. In particular, due to the configuration of the gear trains, the upper unit 15 will rotate in a clockwise direction while the lower unit 15a will rotate in a counterclockwise direction. Further, after a predetermined amount of rotation in one direction, the switch 44 will be thrown to thereby cause reversal of direction of the motor 33, and the rotations of the units 15, 15a will then proceed in the opposite directions, and so the units 15, 15a including the outer races, will oscillate in opposite directions.

There has been provided a gyroscope unit in which the outer races of the bearings on the precession axis or other gimbal axis of the gyroscope, are oppositely oscillated to thereby average out bearing frictional torques which contribute to the "drift" error in a gyroscope. Further, the construction herein provided enables the entire gear train drive including the drive motor and reversing mechanism, i.e., the switch, to be assembled or disassembled independently of the basic gyroscope unit.

While described as directed to the procession axis of the gyro, a similar type of apparatus can be utilized for counter-rotating the bearings on the axis of any of the other gimbals, on which the gyroscope is mounted.

While described as directed to counter-rotating the outer races of the bearings of the gyro, essentially the same type of apparatus can be utilized for rotating the inner races of the bearings, the effect on gyroscope operation being substantially the same.

It will be obvious to those skilled in the art that various changes may be made without departing from the spirit of the invention and therefore the invention is not limited to what is shown in the drawings and described in the specification but only as indicated in the appended claims.

What is claimed is:

1. In a gyroscope, oppositely disposed co-axially aligned shaft bearings, each comprising an inner race, an outer race and balls therebetween, respective extensions on each said outer race including respective extension shafts, a gear fixed to each of said extension shafts, a counter shaft, means drivingly connecting said counter shaft with each said extension shaft gear, and means for rotatably driving said counter shaft, the driving means comprising a reversible electric motor drivingly coupled to said counter-shaft, a reversing switch for said motor, means for actuating said switch after predetermined rotation of one of said extension shafts in each direction thereof, to effect reversal of the direction of rotation of the motor and the said outer races of the bearings, the actuating mechanism for said switch including a headed rod supported by the switch, and a sector fixedly coupled to said one extension shaft for conjoint angular movement coaxially therewith, said sector having a pair of pins fixedly attached thereto, and projecting therefrom in substantial parallelism with the axis of rotation of said one extension shaft, each of said pins being adapted individually to engage said headed rod, one of said pins being adapted to move the headed rod in a direction to cause the switch to reverse the direction of rotation of the motor, the second pin being adapted to engage the surface of the head of the headed rod thereby to move the rod in the opposite direction and cause the switch to restore the motor to its original direction of rotation.

2. In a gyroscope, oppositely disposed co-axially aligned shaft bearings each comprising an inner race, an outer race and balls therebetween, means for rotating said outer races and means for co-ordinating the rotation of said outer races, the means for rotating the outer races of the bearings including an extension on each outer race, said extension including an extension shaft, a worm wheel fixedly attached to the first extension shaft, co-axially therewith, a second shaft mounted substantially perpendicularly to the first extension shaft, said second shaft having a worm integral therewith, to rotatably drive the worm wheel attached to the first extension shaft, a second worm wheel attached to the second shaft, co-axially with the worm, a countershaft substantially parallel to the first extension shaft, said countershaft being adapted to co-ordinate the rotation of the outer race of the first bearing, said countershaft having a driving worm thereon, operative to rotatably drive the worm wheel attached to the second shaft, a switch and means for actuating the switch after predetermined rotation of the first extension shaft, in each direction thereof, a reversible motor operative to drive the outer race rotation control mechanism, said switch being adapted to control the direction of rotation of the motor, thereby to affect reversal of the motor and the outer races of the bearings.

3. In a gyroscope, oppositely dispoesd co-axially aligned shaft bearings, each comprising an inner race, an outer race and balls therebetween, means for oscillating said outer races and means for co-ordinating the oscillation of said outer races, an extension on each said outer race including an extension shaft, a worm wheel fixedly attached to the first extenison shaft, co-axially therewith, a second shaft mounted substantially perpendicularly to the first extension shaft, said second shaft having a worm integral therewith, to rotatably drive the worm wheel attached to the first extension shaft, a second worm wheel attached to the second shaft co-axially with the worm, a countershaft substantially parallel to the extension shaft and spacedly located relative thereto, said countershaft having a driving worm thereon, operative to rotatably drive the worm wheel attached to the second shaft, a reversible electric motor, means drivingly connecting the reversible motor to the countershaft, switch means for said motor, and means connecting said switch means with at least one of said outer races for actuation of said switch means upon predetermined rotation of said outer race in either directions thereof.

4. In a gyroscope, oppositely disposed co-axially aligned shaft bearings, each comprising an inner race, an outer race and balls therebetween, and means for oscillating said oppositely disposed outer races in opposite directions, said oscillating means comprising a reversible electric motor drivingly connected to said outer races, a reversing switch for said motor having two stable positions each corresponding to one direction of rotation of the motor, an actuating rod reciprocatively mounted on said switch and operative upon axial displacement in opposite directions to change the stable position of the switch, a sector member fixedly connected to at least one of said outer races with its circumference concentric therewith, circumferentially spaced pins on said sector member extending substantially parallel to the axis of rotation of said races and adapted individually to engage and displace the actuating rod in opposite directions.

5. In a gyroscope, oppositely disposed co-axially aligned shaft bearings, each comprising an inner race, an outer race and balls therebetween, an extension on each said outer race including an extension shaft, a worm wheel fixedly attached to the extension shaft, co-axially therewith, a second shaft mounted substantially perpendicular to the extension shaft, said second shaft having a worm integral therewith to rotatably drive the worm wheel attached to the extension shaft, a second worm wheel attached to the second shaft co-axially with the worm, a countershaft substantially parallel to the extension shaft and spacedly located realtive thereto, said countershaft having a driving worm thereon operative to rotatably drive the worm wheel attached to the second shaft, a reversible electric motor drivingly coupled to said counter shaft, a reversing switch for said motor, and means for actuating the switch after predetermined rotation of one said extension shaft in each direction to thereby affect reversal of the direction of rotation of the motor and, concomitantly, of the outer races of the bearings.

6. In a gyroscope, oppositely disposed co-axially aligned shaft bearings, each comprising an inner race, an outer race and balls therebetween, an extension on each said outer race including an extension shaft, a worm wheel fixedly attached to the first extension shaft, co-axially therewith, a second shaft mounted substantially perpendicularly to the first extension shaft, said second shaft having a worm integral therewith, to rotatably drive the worm wheel attached to the first extension shaft, a second worm wheel attached to the second shaft, co-axially with the worm, a countershaft substantially parallel to the extension shaft, and spacedly located relative thereto, said countershaft having a driving worm thereon, operative to rotatably drive the worm wheel attached to the second shaft, a motor having a rotatable drive shaft fitted thereto, mounted substantially parallel to the countershaft, and means attached to the shaft of the motor operative to rotatably drive the countershaft, a switch and means for actuating the switch after predetermined rotation of the first extension shaft, in each direction thereof, said motor being reversible, and adapted to be controlled by said switch to thereby affect reversal of the motor and the outer races of the bearings, the actuating mechanism for said switch including a headed pin reciprocatively supported by the switch, a sector fixedly attached to the worm wheel attached to the first extension shaft, co-axially therewith, said sector having a pair of circumferentially spaced pins fixedly attached thereto and projecting therefrom, each of said pins being substantially parallel to the axis of rotation of the first extension shaft, each of said pins being adapted to individually engage the headed pin supported by the switch, one of said pins attached to the sector being adapted to move the headed pin supported by the switch toward the switch, thereby causing the switch to reverse the direction of rotation of the motor, the second pin attached to the sector being adapted to engage the head of the headed pin, thereby to move the head of the pin away from the switch, and in that manner to cause the switch to reverse the direction of the motor, to restore it to its orignal direction.

7. In a gyroscope, oppositely disposed co-axially aligned shaft bearings, each comprising an inner race, an outer race and balls therebetween, and means for oscillating said oppositely disposed outer races in opposite direction, said oscillating means comprising a reversible electric motor, means drivingly connecting said motor and said outer races, switch means for said motor, and means connecting said switch means with a member integral with at least one of said outer races for actuation of said switch means upon predetermined rotation of said outer race in either direction thereof, the means drivingly connecting said motor and said outer races, including an extension on each said outer race including an extension shaft, a worm wheel fixedly attached to the first extension shaft, co-axially therewith, a countershaft substantially parallel to the extension shaft, and spacedly located relative thereto, said countershaft having a first driving worm thereon, and worm gear means interposed between the first driving worm on the countershaft, and the worm wheel attached to the first extension shaft, a worm wheel fixedly attached to the second extension shaft co-axially therewith, an intermediate shaft located near the second extension shaft, the axis of said intermediate shaft being located in a plane substantially perpendicular to the axis of rotation of the second extension shaft, said intermediate shaft having a worm integral therewith, to rotatably drive the worm wheel attached to the second extension shaft, a second worm wheel attached to the intermediate shaft, co-axially with the worm thereon, the countershaft having a second driving worm thereon, co-axial with the first driving worm, the second driving worm being operative to rotatably drive the worm wheel attached to the intermediate shaft, thereby to rotatably drive the second extension shaft.

References Cited by the Examiner
UNITED STATES PATENTS 2,969,680   1/1961   Linn et al. _____ 308—35 X
2,970,480   2/1961   Zeigler et al. _____ 308—183 X BROUGHTON G. DURHAM, *Primary Examiner.*

RICHARD A. DOUGLAS, *Examiner.*

F. C. HAND, *Assistant Examiner.*